(No Model.)
J. D. HUGHES.
CLUTCH FOR FLY WHEEL FOR SEWING MACHINES.
No. 270,672. Patented Jan. 16, 1883.
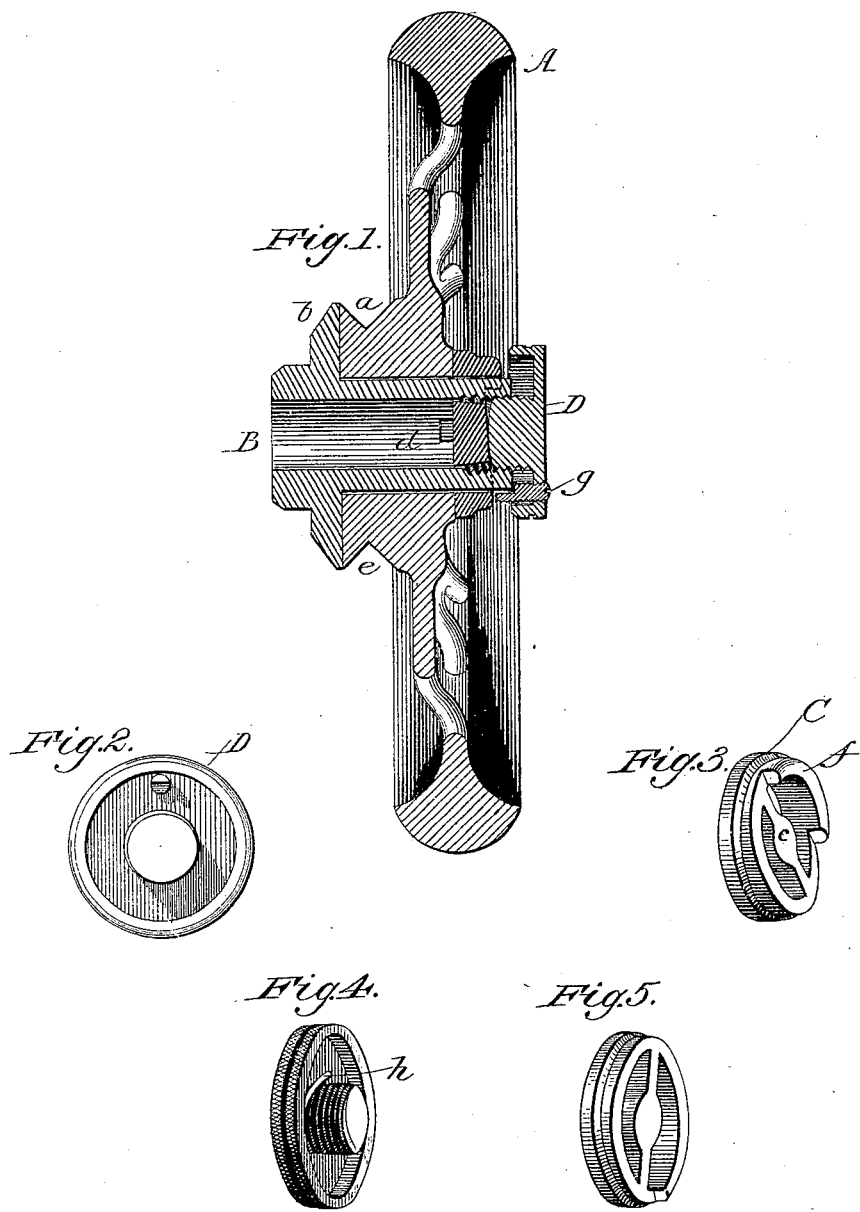
Witnesses.
Will R. Omshundro.
Frank ... Blanchard.
Inventor.
Joseph D. Hughes
By Jno. G. Elliott
Attorney.

UNITED STATES PATENT OFFICE.

JOSEPH D. HUGHES, OF CHICAGO, ILLINOIS, ASSIGNOR TO THE JUNE MANUFACTURING COMPANY, OF SAME PLACE.

CLUTCH FOR FLY-WHEELS FOR SEWING-MACHINES.

SPECIFICATION forming part of Letters Patent No. 270,672, dated January 16, 1883.

Application filed December 2, 1882. (No model.)

To all whom it may concern:

Be it known that I, JOSEPH D. HUGHES, a citizen of the United States, residing in Chicago, county of Cook, and State of Illinois, have invented certain new and useful Improvements in Clutches for Fly-Wheels for Sewing-Machines, of which the following is a specification.

My invention relates to improvements in clutches for fly-wheels for sewing-machines, in which the fly-wheel has cast therewith or otherwise rigidly secured a sheave, and has a loose bearing upon a flanged sleeve rigid upon the shaft, between which flange and a washer upon the opposite end of the sleeve the wheel may be clamped and held by frictional contact to cause it to revolve with the shaft, or on the other hand when the fly-wheel is released from such frictional contact it will be an idler upon the shaft, the purpose of the above-described construction being to provide for operating the bobbin-winding attachment as commonly employed and arranged in sewing-machines independently of the sewing mechanism, or, in other words, to operate the bobbin-winding attachment through the medium of the treadle, crank-wheel, and fly-wheel without actuating the sewing mechanism, and vice versa.

Prior to my invention the adjustable cap or nut employed for tightening the fly-wheel has been subject to the objection of becoming detached from its bearing when releasing the fly-wheel to operate the bobbin, the result of which detachment was that the cap and washer frequently became injured or lost by dropping on the floor, and, besides, was a continuous source of annoyance, liable to occur every time the cap was operated.

The object of my invention is to remove these objections without destroying or limiting the effectiveness of the cap by providing means for limiting the play of the cap, so as to prevent its accidental detachment, but permitting the cap to be removed when desired.

I attain this object by devices illustrated in the accompanying drawings, in which—

Figure 1 is a sectional view of a fly-wheel and clutch mechanism embodying my invention; Fig. 2, a plan view of the inner face of the cap-tightener; Fig. 3, a detail perspective, showing the outer face of the washer sleeved upon the flanged sleeve, but revolving therewith whether tightened or loose; Fig. 4, a perspective of a modification of the cap, and Fig. 5 a similar view of a corresponding modification of the washer.

Similar letters of reference indicate the same parts in the several figures of the drawings.

A represents a fly-wheel loose upon a sleeve, B, having cast therewith or otherwise rigidly secured a flange, $b$, the inner face of which is contiguous to the end of the hub $a$ of the wheel, the opposite end of the sleeve projecting beyond the outer face of the wheel and internally screw-threaded along its projecting portion.

Sleeved upon the projecting end of the sleeve B is a washer, C, provided with a transverse diaphragm, $c$, which enters corresponding elongated opposing slots $d$ in the sleeve, whereby the washer may have a longitudinal but not a rotary motion except with the sleeve, the distance between the inner end of the slot and the inner face of the flange $b$ being less than the length of the hub of the wheel, so that when the washer is forced against the hub may be rigidly clamped between the washer and flange.

Working in the screw-threaded end of the sleeve is a cap, D, the periphery of which is milled in the usual manner to provide for taking a firm hold in operating the cap. Tightening the cap in the sleeve forces the washer forward against and clamps the wheel between the washer and flange, in which position the wheel actuates the sewing mechanism by reason of the band of the machine passing over a sheave, $e$, cast with the hub of the wheel, and the sleeve being rigidly secured at all times to the drive-shaft of the sewing-machine, the fly-wheel being rendered idle upon the sleeve when operating the bobbin-winding attachment by unscrewing the cap D and releasing the washer from tight contact with the hub of the wheel.

It will be observed that the cap, when tightened, extends but a short distance in the sleeve, hence is liable to detachment by unscrewing it too far; but this objection is obviated and the accidental detachment of the cap prevented by providing the outer face of the washer with a right-angular lug or projection, $f$, which serves to limit the play of the screw $g$, held by and projected through the cap, thus permitting the cap to be released from or held in contact with the washer, and have no more play or working room than is necessary to these ends.

Instead of the lug $f$, a screw may be substituted, or a spring, $h$, secured to the cap, as shown in Fig. 4, be substituted, for the screw $g$, for in either case the movement of the cap will be effectually limited.

Whether spring or screw-stop is employed, the cap may be removed when desired by withdrawing the screw or by lifting the spring with a knife-blade or other suitable instrument until cleared of the projection on the washer, and then turning the cap.

Having thus described my invention, what I claim, and desire to secure by Letters Patent, is—

1. In sewing-machine clutches for fly-wheels, the combination, with the flanged sleeve and the washer thereof, of a tightening-cap provided with a projection or spring adapted to limit the play of said cap, substantially as described.

2. In sewing-machine clutches for fly-wheels, the combination, with the flanged sleeve and the washer thereof, of a tightening-cap provided with a removable projection adapted to limit the play of said cap, substantially as described.

JOSEPH D. HUGHES.

Witnesses:
JNO. G. ELLIOTT,
W. W. ELLIOTT.